United States Patent [19]
Henry

[11] Patent Number: 5,319,687
[45] Date of Patent: Jun. 7, 1994

[54] DEVICE FOR PREVENTING MELT-THROUGH OF A REACTOR VESSEL

[75] Inventor: Robert E. Henry, Naperville, Ill.

[73] Assignee: Westinghouse Electric Corp., Pittsburgh, Pa.

[21] Appl. No.: 100,893

[22] Filed: Jul. 30, 1993

[51] Int. Cl.$^5$ .............................................. G21C 15/18
[52] U.S. Cl. .................................................... 376/299
[58] Field of Search .............. 376/277, 282, 283, 298, 376/299

[56] References Cited
U.S. PATENT DOCUMENTS
3,168,445  2/1965  Ziegler et al. ...................... 376/282

Primary Examiner—Daniel D. Wasil
Attorney, Agent, or Firm—Peyton C. Watkins

[57] ABSTRACT

A device for preventing melt-through of a reactor vessel comprising a first spray nozzle means disposed adjacent a bottom of the reactor vessel for spraying between 50 and 375 gpm of cooling water onto the lower bottom of the reactor vessel and for cooling and preventing melt-through of the reactor vessel; a second spray nozzle means disposed adjacent a body of the reactor vessel for spraying between 100 and 750 gpm of cooling water onto the body of the reactor vessel and for cooling and preventing melt-through of the reactor vessel; and a third spray nozzle means disposed adjacent an upper head of the reactor vessel for spraying between 50 and 375 gpm of cooling water onto the upper head of the reactor vessel and for cooling and preventing melt-through of the reactor vessel.

9 Claims, 2 Drawing Sheets

DEVICE FOR PREVENTING MELT-THROUGH OF A REACTOR VESSEL

BACKGROUND OF THE INVENTION

1. Field of the Invention

The present invention relates to a device for cooling a reactor vessel under a severe accident condition and, more particularly, to such a device having spray nozzles respectively positioned adjacent a vessel bottom, an upper head, and a body of the reactor vessel for cooling the reactor vessel and preventing melt-through.

2. Description of the Invention

In a commercial nuclear reactor, heat, from which steam and ultimately electricity are generated, is produced by fissioning of a fissible material, such as enriched uranium, contained in a reactor core which is, in turn, contained within the reactor vessel. The reactor vessel includes a flanged closure head bolted atop a flanged reactor body; the reactor vessel is entirely contained within a containment building for containing any unlikely radiation leakage within the containment building should an accident occur. A coolant, typically water, flows through the reactor core for controlling the nuclear reaction and for conveying the generated heat away from the reactor vessel.

Due to safety concerns, various safety mechanisms are present for safely shutting down the nuclear process and for containing any radiation within the reactor vessel or, as a final safety device, within the containment building. One safety concern is to contain the fissible material if the water is completely drained from the reactor vessel leaving the fissible material uncovered. This would cause the fissible material to melt which, in turn, would cause the reactor vessel body to structurally fail, generally referred to as melt-through, if the fissible material or the reactor vessel, or both, are not cooled by water.

Although not particularly directed to melt-through, in a pressurized water reactor system, one safety mechanism, a containment spray system (CSS), is for limiting the pressure in the containment building, as is well known in the art. The CSS sprays a sodium hydroxide solution of borated water into the containment building and, thus, onto the reactor vessel for limiting the pressure inside the containment building and, as a secondary effect, cooling the reactor vessel.

Although the present systems for shutting down and containing the nuclear process are satisfactory, there are areas where, due to improved technology or the like, the extent of protection for severe accidents may be expanded, for example by preventing melt-through of the reactor vessel.

Consequently, a need exists for an improved device for cooling the reactor vessel.

SUMMARY OF THE INVENTION

The present invention provides an improvement designed to satisfy the aforementioned needs. Particularly, the present invention is directed to a device for preventing melt-through of a reactor vessel comprising a) a first spray nozzle means disposed adjacent a bottom of the reactor vessel for spraying between 50 and 375 gpm of cooling water onto the bottom of the reactor vessel and for cooling and preventing melt-through of the reactor vessel ; b) a second spray nozzle means disposed adjacent a body of the reactor vessel for spraying between 100 and 750 gpm of cooling water onto the body of the reactor vessel and for cooling and preventing melt-through of the reactor vessel; and c) a third spray nozzle means disposed adjacent an upper head of the reactor vessel for spraying between 50 and 375 gpm of cooling water onto the upper head of the reactor vessel and for cooling and preventing melt-through of the reactor vessel.

BRIEF DESCRIPTION OF THE DRAWINGS

In the course of the following detailed description, reference will be made to the attached drawings in which.

DETAILED DESCRIPTION OF THE INVENTION

Figure 1:
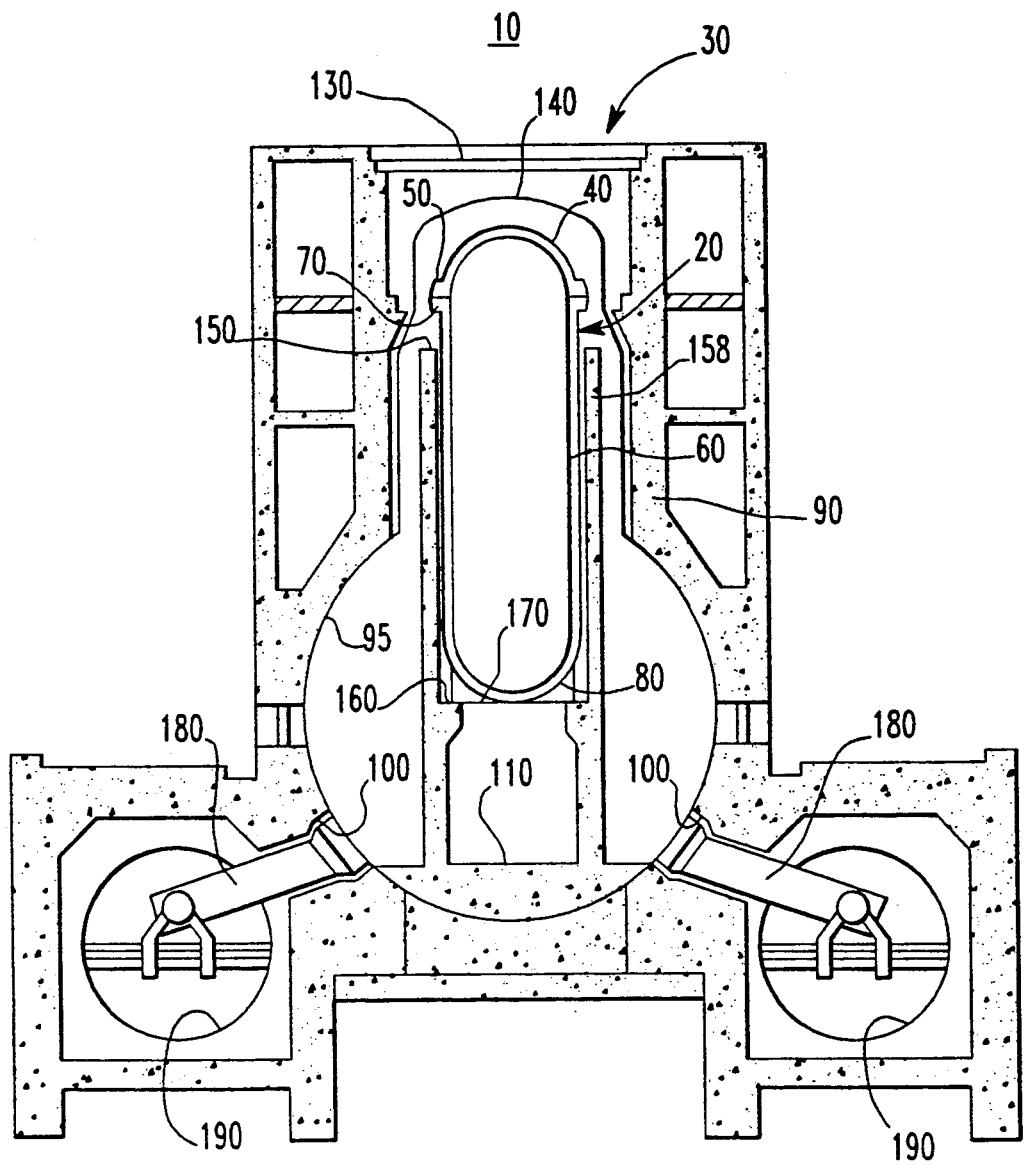
FIG. 1 is a view in vertical cross section of a containment building containing a reactor vessel.

In the following description, like reference characters designate like or corresponding parts throughout the several views of the drawings. Also in the following description, it is to be understood that such terms as "forward," "rearward," "left," "right," "upwardly," "downwardly," and the like are words of convenience and are not to be construed as limiting terms.

Referring now to FIG. 1, a schematic view of a portion of a boiling water reactor (BWR) plant, generally referred to as 10, is shown, although the present invention is also applicable to a pressurized water reactor system (PWR). The BWR 10 includes a reactor vessel 20, for containing the nuclear fuel (not shown), positioned inside a containment building 30 which would contain any radioactive fission products which might leak from the reactor vessel 120 into the containment building 30 if an accident were to occur. The containment building 30 illustrated in FIG. 1 is a Mark I type, although any type containment building 30 may be used with the present invention. The reactor vessel 20 includes a dome shaped reactor head 40 having a flange 50 at its lower portion, a cylindrical shaped body 60 having a flange 70 at its upper portion, and a dome shaped bottom 80 (lower head) integrally attached to the body 60. Both flanges 50 and 70 include a plurality of holes (not shown) therethrough; each hole containing a bolt (not shown) for attaching the head 40 to the body 60. The containment building 30 typically includes a steel lined concrete side 90 having an enlarged bottom portion 95, which is also steel lined, at its lower portion. The portion 95 includes two hollowed out portions 100 therethrough at its lower portion. The side 90 terminates at a concrete floor 110. A stainless steel top 130 is positioned atop the side 90 for sealing the containment building 30. A steel dome 140 is positioned inside both the side 90 and top 130 and beneath the floor 110 for further sealing of the containment building 30. A Vertically oriented, concrete cylinder 150 is positioned on the floor 110, and includes a lip portion 160 extending therefrom. A steel skirt 170 rests on the lip portions 160 and supports the reactor vessel 20. Two pipes 180 extend through the hollowed out portions 100 and are attached to the liner 140 for passing any steam that may build up inside the liner 140 to a suppression pool 190 where it is condensed.

Figure 2:
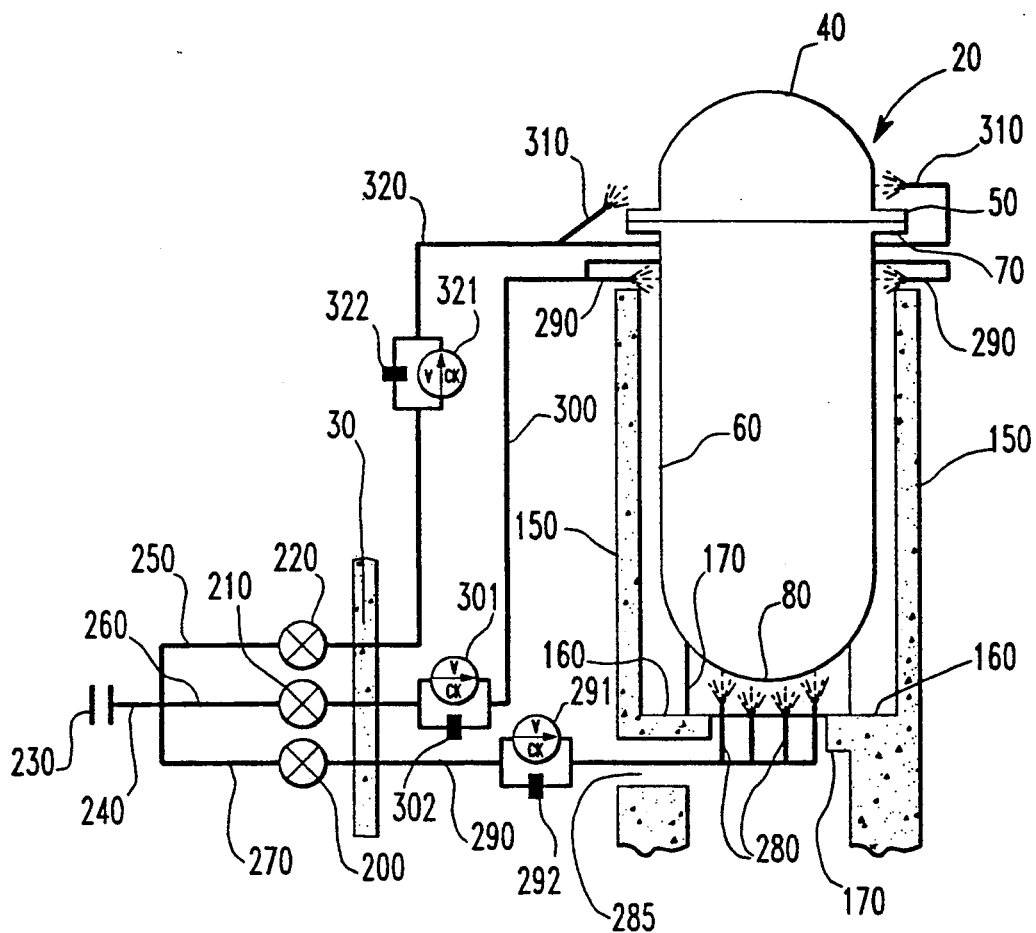
FIG. 2 is a side view in vertical cross section of a boiling water reactor vessel illustrating a cooling device of the present invention.

Referring to FIG. 2, the cooling system of the present invention is illustrated for preventing melt-through (i.e., structural failure of the reactor vessel 20). A flange 230 for attachment to a water source (not shown) is attached to a pipe 240 for passing cooling water to the reactor vessel 20. The flange 230 is attached to the water source only when the system of the present invention is activated which prevents accidental activation of the cooling system. For all other conditions, except testing, the flange is closed off by a blank flange. The pipe 240 branches into three pipes 250, 260, and 270 which are respectively attached to a first, second, and third valve 200, 210, and 220. The first, second, and third valves 200, 210, and 220 are positioned outside the containment building 30 and control the flow of the cooling water to the reactor vessel 20. These valves are typically left in a fully open state.

In regard to cooling the bottom 80, a plurality of first spray nozzles 280 are positioned adjacent the bottom 80 of the reactor vessel 20 for spraying water thereon. A first pipe 290 is attached to and extends between the first spray nozzles 280 and the first valve 200 for providing a water passageway to the first spray nozzles 280. An opening 285 extends through the concrete cylinder 150 for providing the pipe 290 a passageway to the bottom 80. Inside the containment building 30, the pipe 290 branches out into two pipe branches and then merges back to a single pipe. A first check valve 291 and a first reverse rupture disk 292 are respectively interposed on a branch on the pipe 290 for preventing backflow of the water inside the pipe 290. The check valve 291, when in the open position, allows flow in only one direction, as is well known in the art, and when the system is operated, the check valve 291 opens and allows the water to flow towards the reactor vessel 20. When the system is deactivated, the check valve 291 closes and prevents the water from flowing away from the reactor vessel 20. The first rupture disc 292 functions as a safety mechanism in case the check valve 291 fails to open. In such a case, the first rupture disk 292 ruptures due to the pressure of the water source (not shown) and allows the water to pass therethrough. For all other cases, except failure of the check valve 291, the first rupture disc 292 prevents flow of the cooling water. The spray nozzles 280 are disposed spaced apart inside the skirt 170 and evenly distribute the water onto the lower bottom 80. Holes (not shown) extend through skirt 170 to allow the first spray nozzles to extend upwardly into the skirt 170. Preferably, the water is sprayed between 50 and 375 per minute (gpm) onto the bottom 80.

In regard to cooling the body 60, a plurality of second spray nozzles 290 are positioned adjacent the side 60 of the reactor vessel 20 for spraying water thereon. A second pipe 300 is attached to and extends between the second spray nozzles 290 and the second valve 210 for providing a water passageway to the second spray nozzle 290. The pipe 300 branches into two pipe branches and then merges back into a single pipe. A second check valve 301 and a third reverse rupture disk 302 are interposed on a branch of the pipe 300 and both function as stated hereinabove. The second spray nozzles 290 are disposed upwardly over the concrete cylinder 150 and circumferentially around the body 60 for evenly distributing the water onto the side 60. Preferably, the water is sprayed onto the side 60 between 100 and 750 gpm.

In regard to cooling the upper head 40, a plurality of third spray nozzles 310 are positioned adjacent the upper head 40 of the reactor vessel 20 for spraying water thereon. A third pipe 320 is attached to and extends between the third spray nozzles 310 and the third valve 220 for providing a water passageway to the third spray nozzles 310. The pipe 310 also branches into two pipe branches and then merges back to a single pipe. A third check valve 321 and a third reverse direction rupture disk 322 are respectively interposed on a branch of the pipe 320 and function as stated hereinabove. The third spray nozzles 310 are disposed adjacent the upper head 40 and circumferentially around the upper head 40 for evenly distributing the water onto the upper head 40. Preferably, the water is sprayed between 50 and 375 (gpm) onto the upper head 40.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described merely a preferred or exemplary embodiment thereof.

I claim:

1. A device for preventing melt-through of a reactor vessel comprising:
   a) a first spray nozzle means disposed adjacent a bottom of the reactor vessel for spraying generally between 50 and 375 gpm of cooling water onto the bottom of the reactor vessel and for cooling and preventing melt-through of the reactor vessel;
   b) a second spray nozzle means disposed adjacent a body of the reactor vessel for spraying generally between 100 and 750 gpm of cooling water onto the body of the reactor vessel and for cooling and preventing melt-through of the reactor vessel; and
   c) a third spray nozzle means disposed adjacent an upper head of the reactor vessel for spraying generally between 50 and 375 gpm of cooling water onto the upper head of the reactor vessel and for cooling and preventing melt-through of the reactor vessel.

2. The device as in claim 1 further comprising a first, second and third valve respectively attached to said first, second, and third spray nozzles means for controlling the flow of the water to said first, second, and third spray nozzles means.

3. The device as in claim 2 further comprising a flanged connection connected to said first, second, and third valves for connection to a water source and for preventing accidental activation of said first, second, and third spray nozzles means.

4. The device as in claim 1 wherein said first spray nozzle means includes a plurality of spray nozzles means disposed adjacent the bottom of the reactor vessel.

5. The device as in claim 4 wherein said second spray nozzle means includes a plurality of spray nozzles means disposed adjacent the body of the reactor vessel.

6. The device as in claim 5 wherein said third spray nozzle means includes a plurality of spray nozzles means disposed adjacent the upper head of the reactor vessel.

7. The device as in claim 2 further comprising a first, second, and third conduit respectively attached between said first valve and said first spray nozzle means, between said second valve and said second spray nozzle means, and between said third valve and said third spray nozzle means for providing a water passageway.

8. The device as in claim 7 further comprising a first, second, and third check valve respectively positioned on said first, second, and third conduit for allowing flow of the cooling water in only one direction.

9. The device as in claim 8 further comprising a first, second, and third reverse rupture disc respectively and cooperatively associated with said first, second, and third check valves for allowing flow of the cooling water when its associated check valve fails to open.

* * * * *